(12) United States Patent
Zhou et al.

(10) Patent No.: US 10,581,961 B2
(45) Date of Patent: Mar. 3, 2020

(54) METHOD FOR DETECTING ABNORMAL LOAD IN CLOUD COMPUTING ORIENTED ONLINE SERVICE

(71) Applicant: Tsinghua University, Beijing (CN)

(72) Inventors: Yuezhi Zhou, Beijing (CN); Jinzhao Liu, Beijing (CN); Di Zhang, Beijing (CN); Yaoxue Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 270 days.

(21) Appl. No.: 15/786,426

(22) Filed: Oct. 17, 2017

(65) Prior Publication Data

US 2018/0041573 A1 Feb. 8, 2018

Related U.S. Application Data

(63) Continuation of application No. PCT/CN2015/098770, filed on Dec. 24, 2015.

(30) Foreign Application Priority Data

Jul. 16, 2015 (CN) .......................... 2015 1 0419286

(51) Int. Cl.
*H04L 29/08* (2006.01)
*G06F 11/34* (2006.01)
(Continued)

(52) U.S. Cl.
CPC ...... *H04L 67/1023* (2013.01); *G06F 11/2066* (2013.01); *G06F 11/3433* (2013.01);
(Continued)

(58) Field of Classification Search
CPC .............. H04L 41/142; H04L 67/1008; H04L 67/1023; G06F 11/3433; G06F 11/2066
See application file for complete search history.

(56) References Cited

U.S. PATENT DOCUMENTS 9,355,007 B1 * 5/2016 Eicher ................. G06F 11/3428
9,614,742 B1 * 4/2017 Zhang ................. H04L 43/0823
(Continued)

FOREIGN PATENT DOCUMENTS

| CN | 101252482 | 8/2008 |
|---|---|---|
| CN | 105071983 | 11/2015 |
| JP | 2015075896 | 4/2015 |

OTHER PUBLICATIONS

Wang, Chengwei, Vanish Talwar, Karsten Schwan, and Parthasarathy Ranganathan. "Online detection of utility cloud anomalies using metric distributions." In 2010 IEEE Network Operations and Management Symposium-NOMS 2010, pp. 96-103. IEEE, 2010. (Year: 2010).*

(Continued)

*Primary Examiner* — Philip J Chea
*Assistant Examiner* — Ruth Solomon
(74) *Attorney, Agent, or Firm* — Hodgson Russ LLP (57) ABSTRACT

Disclosed are a method and device for detecting an abnormal load. The method includes: collecting data of each load item in all hosts; pre-processing to obtain a second sequence corresponding to each load item; obtaining a coefficient matrix and a detail vector; computing a weighted mean of abnormal load probabilities of all the coefficient vectors, to obtain an abnormal load probability of each second sequence; comparing the abnormal load probability with a confidence interval, and judging whether there is an abnormal load, and judging that there is no abnormity in the corresponding second sequence if the abnormal load probability of each second sequence is in the confidence interval; judging whether there is an abnormal load according to data of all load items and the abnormal load probability of each second sequence; and finding a bearing host that has the abnormal load from the current online service.

10 Claims, 5 Drawing Sheets

(51) Int. Cl.
  *G06F 11/20* (2006.01)
  *H04L 12/24* (2006.01)
  *H04L 12/26* (2006.01)
(52) U.S. Cl.
  CPC .......... H04L 41/142 (2013.01); H04L 43/022 (2013.01); H04L 67/1008 (2013.01); *G06F 11/3452* (2013.01)

(56) References Cited

U.S. PATENT DOCUMENTS

| | | | | |
|---|---|---|---|---|
| 9,843,596 | B1* | 12/2017 | Averbuch | H04L 63/1416 |
| 10,395,032 | B2* | 8/2019 | Keller | |
| 2014/0040174 | A1* | 2/2014 | Leung | G06F 11/0751 |
| | | | | 706/12 |
| 2015/0081881 | A1* | 3/2015 | Eaton | H04L 47/785 |
| | | | | 709/224 |
| 2015/0215433 | A1* | 7/2015 | Leung | H04L 43/08 |
| | | | | 709/224 |
| 2016/0098561 | A1* | 4/2016 | Keller | G06F 21/554 |
| | | | | 726/24 |
| 2016/0164721 | A1* | 6/2016 | Zhang | H04L 41/142 |
| | | | | 709/224 |
| 2016/0359872 | A1* | 12/2016 | Yadav | H04L 43/04 |

OTHER PUBLICATIONS

WIPO, English translation of the ISR/WO for PCT Application CN2015098770, dated Apr. 21, 2016.

Chen, Ning et al. "Anomaly Detection and Location Method of Network Traffic Based on Wavelet Analysis", Journal of Chinese Computer Systems, vol. 31, No. 1, p. 55-61, Wuhan, China, Jan. 31, 2010.

* cited by examiner

METHOD FOR DETECTING ABNORMAL LOAD IN CLOUD COMPUTING ORIENTED ONLINE SERVICE

CROSS REFERENCE TO RELATED APPLICATION

This application is a continuation of International Application No. PCT/CN2015/098770 filed Dec. 24, 2015, which claims priority to Chinese Patent Application No. 201510419286.1, filed with the Status Intellectual Property Office of P. R. China on Jul. 16, 2015, the contents of which are incorporated herein by reference in their entirety.

FIELD

The present disclosure relates to cloud computing application technology field, and more particularly to a method for detecting an abnormal load and an abnormal operating condition of an online service according to history data of loads of the online service.

BACKGROUND

With the development of cloud computing technology, more and more users deploy or migrate services to a platform based on cloud architecture. With the cloud computing technology, resources of computation, storage and network assigned to a certain service may be increased or reduced according to requirement. Online services have a large proportion among all services deployed to the cloud platform. As the online service directly provides a service interface to the user, loads of the online service are impacted by user accesses easily.

SUMMARY

The present disclosure provides a method for detecting an abnormal load in a cloud computing oriented online service. The method includes: step 1, collecting data of each load item in all hosts that bears a current online service with a fixed sampling period; step 2, pre-processing the data of each load item in all hosts to obtain a first sequence with a fixed time interval, and merging first sequences of all hosts for each load item to obtain a second sequence corresponding to each load item; step 3, obtaining a coefficient matrix and a detail vector by performing a discrete wavelet transform to each second sequence, and computing an abnormal load probability for each coefficient vector of the coefficient matrix by performing a statistical analysis to each coefficient vector of the coefficient matrix; step 4, computing a weighted mean of the abnormal load probabilities of all the coefficient vectors of the coefficient matrix with a weighted formula, to obtain an abnormal load probability of each second sequence; step 5, comparing the abnormal load probability of each second sequence with a confidence interval given by a confidence function, and judging whether there is an abnormal load, and judging that there is no abnormity in the corresponding second sequence if the abnormal load probability of each second sequence is in the confidence interval; step 6, judging whether there is an abnormal load in the current online service according to data of all load items of the current online service and the abnormal load probability of each second sequence of the current online service, and comprising steps of: step 6.1, obtaining second sequences of all load items that have the abnormity in the current online service according to a judging result of step 5; and step 6.2, for each load item that has the abnormity, recording a time point corresponding to a last point in the second sequence of each load item as an occurring time point of the abnormal load, and storing the recorded items into the online service data base; and step 7, finding a bearing host that has the abnormal load from the current online service by using K-means clustering algorithm.

The present disclosure provides a device for detecting an abnormal load in a cloud computing oriented online service. The device includes a processor; and a memory for storing instructions executable by the processor. The processor is configured to: collect data of each load item in all hosts that bears a current online service with a fixed sampling period; pre-process the data of each load item in all hosts to obtain a first sequence with a fixed time interval, and merge first sequences of all hosts for each load item to obtain a second sequence corresponding to each load item; obtain a coefficient matrix and a detail vector by performing a discrete wavelet transform to each second sequence, and compute an abnormal load probability for each coefficient vector of the coefficient matrix by performing a statistical analysis to each coefficient vector of the coefficient matrix; compute a weighted mean of the abnormal load probabilities of all the coefficient vectors of the coefficient matrix with a weighted formula, to obtain an abnormal load probability of each second sequence; compare the abnormal load probability of each second sequence with a confidence interval given by a confidence function, and judge whether there is an abnormal load, and judge that there is no abnormity in the corresponding second sequence if the abnormal load probability of each second sequence is in the confidence interval; obtain second sequences of all load items that have the abnormity in the current online service according to a judging result of step 5; and for each load item that has the abnormity, record a time point corresponding to a last point in the second sequence of each load item as an occurring time point of the abnormal load, and store the recorded items into the online service data base; and find a bearing host that has the abnormal load from the current online service by using K-means clustering algorithm.

The present disclosure provides a non-transitory computer-readable storage medium having stored therein instructions that, when executed by a processor of a device, causes the device to perform a method for detecting an abnormal load in a cloud computing oriented online service. The method includes: step 1, collecting data of each load item in all hosts that bears a current online service with a fixed sampling period; step 2, pre-processing the data of each load item in all hosts to obtain a first sequence with a fixed time interval, and merging first sequences of all hosts for each load item to obtain a second sequence corresponding to each load item; step 3, obtaining a coefficient matrix and a detail vector by performing a discrete wavelet transform to each second sequence, and computing an abnormal load probability for each coefficient vector of the coefficient matrix by performing a statistical analysis to each coefficient vector of the coefficient matrix; step 4, computing a weighted mean of the abnormal load probabilities of all the coefficient vectors of the coefficient matrix with a weighted formula, to obtain an abnormal load probability of each second sequence; step 5, comparing the abnormal load probability of each second sequence with a confidence interval given by a confidence function, and judging whether there is an abnormal load, and judging that there is no abnormity in the corresponding second sequence if the abnormal load probability of each second sequence is in the confidence interval; step 6.1, obtaining second sequences of all load items that have the abnormity in the current online service according to a judging result of step 5; and step 6.2, for each load item that has the abnormity, recording a time point corresponding to a last point in the second sequence of each load item as an occurring time point of the abnormal load, and storing the recorded items into the online service data base; and step 7, finding a bearing host that has the abnormal load from the current online service by using K-means clustering algorithm.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure, in which the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The present disclosure provides a method for detecting an abnormal load in a cloud computing oriented online service. The method uses history data of loads of the online service to detect the abnormal load of the online service by wavelet analysis and statistical analysis. Referring drawings and embodiments, detailed descriptions are as follows.

Figure 1:
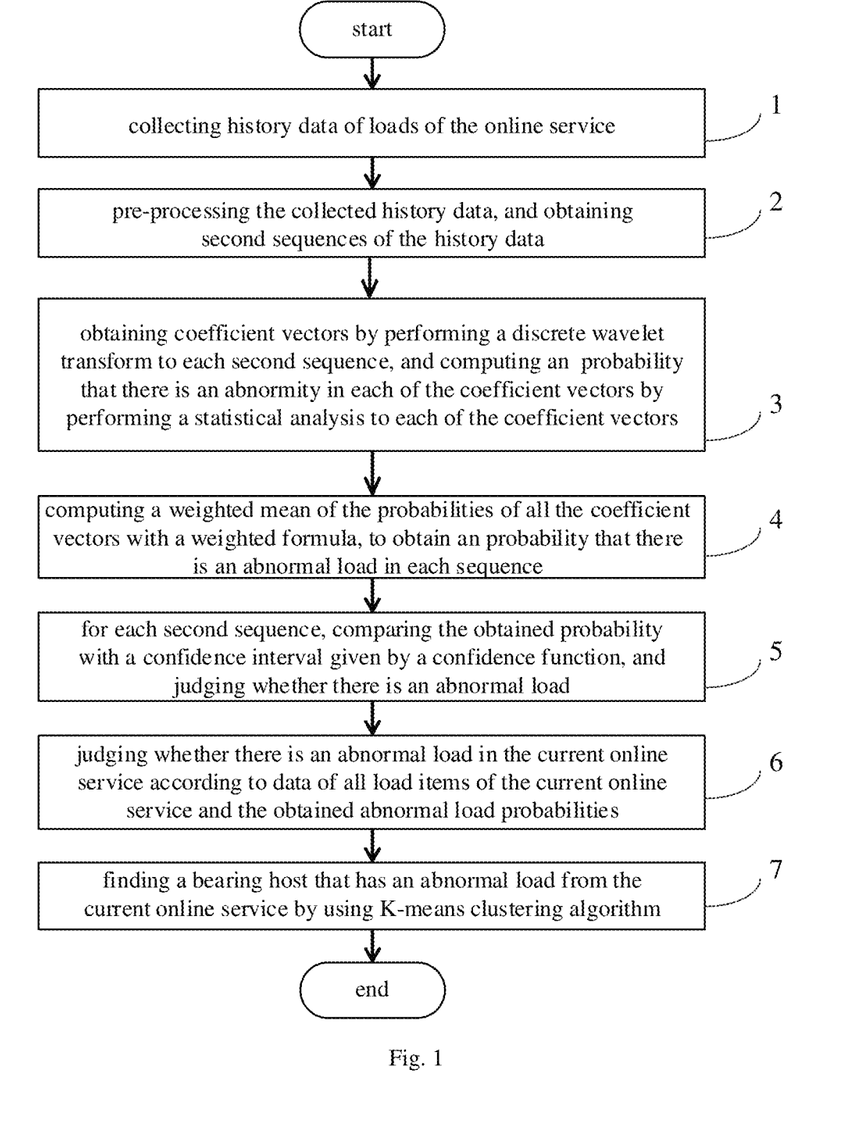
FIG. 1 is a flow chart of a method for detecting an abnormal load in a cloud computing oriented online service according to an embodiment of the present disclosure.

A flow chart of the method provided in the present disclosure is illustrated as FIG. 1, which includes followings.

In step 1, data of each load item in all hosts that bears the online service is collected with a fixed sampling period. The data of each load item mainly includes a Central Processing Unit CPU usage rate, a memory usage rate, a disk I/O usage rate or a network I/O usage rate. The data of each load item is denoted as $(d_1^x, d_2^x, \ldots, d_i^x, \ldots, d_n^x)$, in which $d_i^x$ is a value of the load item x at an $i^{th}$ time point of each host, i=1, 2, ..., n, n is a positive integer, and x is the CPU usage rate, the memory usage rate, the disk I/O rate or the network I/O rate.

In this embodiment, the CPU usage rate is taken as an example for illustration. The CPU usage rate is sampled every 5 minutes by default, and a data point sampled at each time represents an average CPU usage rate in 5 minutes pasted corresponding to the each time. A sequence of data points is stored as a tuple, denoted as $(d_1^{cpu}, d_2^{cpu}, \ldots, d_i^{cpu}, \ldots, d_n^{cpu})$. The collected data of each load item is recorded in an online service database (such as a MySQL database). A format for recording the data of each load item is shown as table 1.

TABLE 1

Formats and examples of recording data of each load item

| fields | description | type | length | examples |
|---|---|---|---|---|
| MID | host identifier | character string | 64 | Z1V3_109452 |
| Service | service identifier | character string | 64 | WebServer1 |
| Time | timestamp | character string | 64 | 2014 Oct. 31 13:10:10 |
| CPU | CPU usage rate | float | 4 | 0.9231 |
| Mem | memory usage rate | float | 4 | 0.9231 |
| Disk | disk I/O usage rate | float | 4 | 0.9231 |
| Net | network I/O usage rate | float | 4 | 0.9231 |

In step 2, the collected data of each load item in all hosts is pre-processed. The data of each load item corresponding to a current online service is processed into a first sequence with a fixed time interval. If data at a time point is null, interpolation is performed to the data at the time point. The first sequence of each load item of each host is stored as a tuple, and denoted as $(s_1^x, s_2^x, \ldots, s_i^x, \ldots, s_n^x)$, in which $s_i^x = \text{average}(d_{(i-1) \times k+1}^x, d_{(i-1) \times k+2}^x, \ldots, d_{(i-1) \times k+k}^x)$, in which k is a ratio of the fixed time interval to the fixed sampling period (for example, in this embodiment, the CPU usage rate is denoted as $(s_1^{cpu}, s_2^{cpu}, \ldots, s_i^{cpu}, \ldots, s_n^{cpu})$. The collected data is processed into first sequences with the fixed time interval (default value of the fixed time interval is 15 minutes in this embodiment), in which k=3, $s_i^{cpu} = \text{average}(d_{3i+1}^{cpu}, d_{3i+2}^{cpu}, d_{3i+3}^{cpu})$, and then the data of all hosts for each load item are merged, and second sequences of each load item corresponding to the current service are obtained. Specific implement process is illustrated as FIG. 2, including followings.

Figure 2:
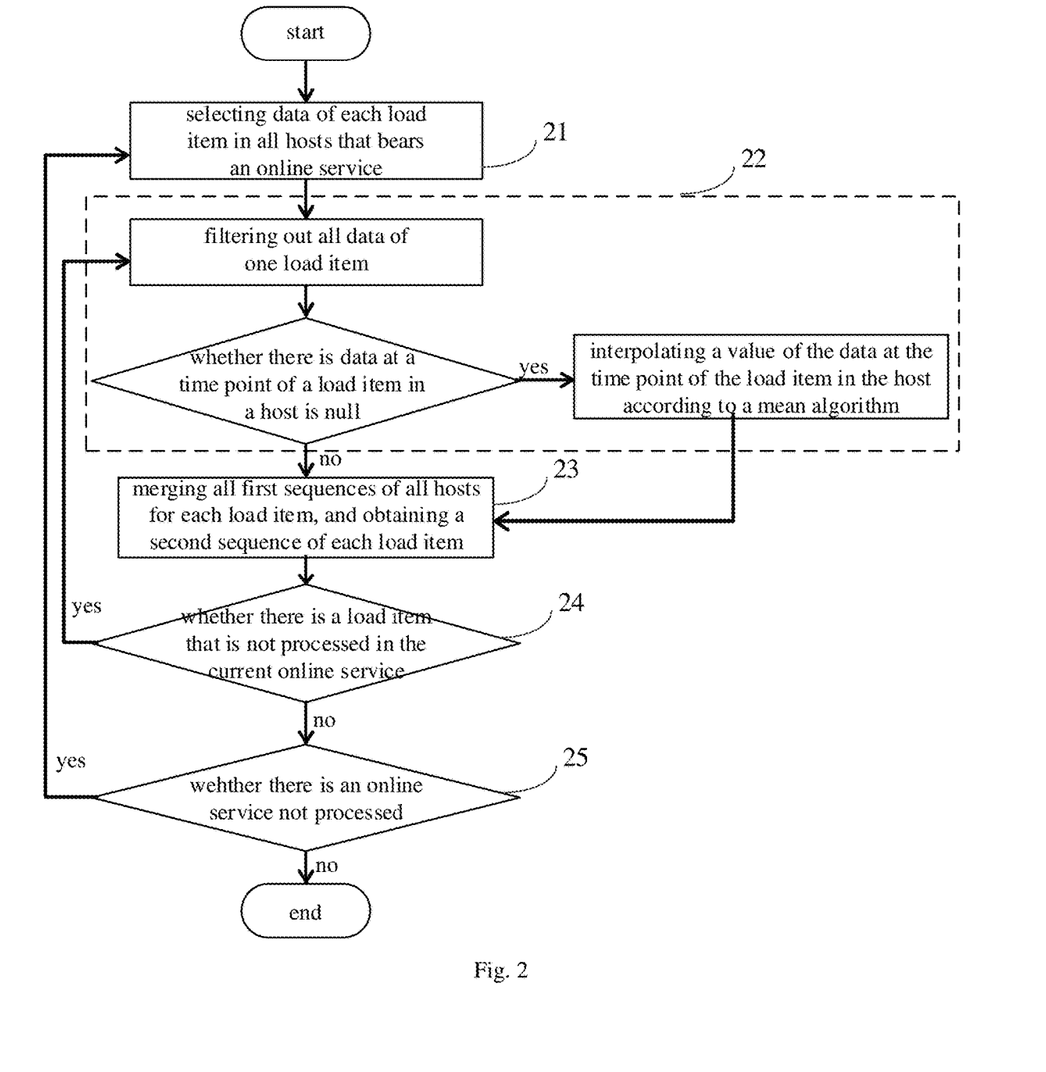
FIG. 2 is a flow chart of pre-processing data of an online service in step 2 according to an embodiment of the present disclosure.

In step 2.1, the data of each load item in all hosts that bears the online service is selected, and the data is processed into the first sequence with the fixed time interval, in which the first sequence is stored as a tuple.

In step 2.2, all data of one load item is filtered out. If data at a time point of a load item in a host is null, a value of the data at the time point of the load item in the host is interpolated according to a mean algorithm. For example, for a sequence $\{C_1, C_2, \ldots, C_i, \ldots, C_k, \ldots, C_n\}$, in which $C_k$ is a missing item, supposing that an initial value of $C_k$ is 0, and then a value of $C_k$ which is computed according to following formula (1) is interpolated to the data at the time point, $$C_k = \sum_{i=1}^{n} C_i / (n-1). \quad (1)$$

In step 2.3, first sequences of all hosts are merged for each load item, and a second sequence of each load item is obtained, in which the second sequence of each load item is expressed as $(S_1^x, S_2^x, \ldots, S_i^x, \ldots, S_n^x)$, in which $S_i^x$ is merged at time point i as following formula:

$$S_i^x = \sum_{j=1}^{q} s_{i,j}^x / q \quad (2),$$

in which, $s_{i,j}^x$ is a value of the load item at time point i of host j, q is the number of the hosts.

In step 2.4, if there is a load item that is not processed in the current online service, step 2.1 is executed, otherwise step 3 is executed.

Figure 3:
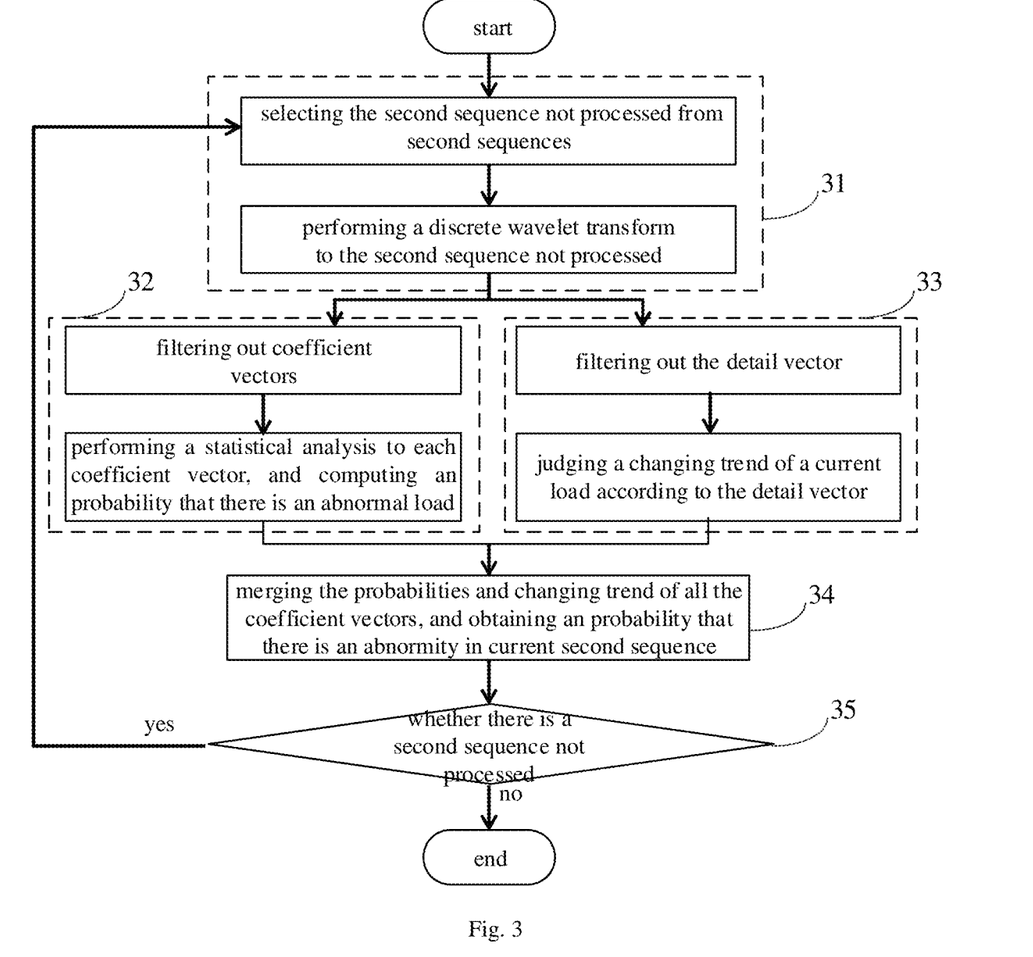
FIG. 3 is a flow chart of computing an abnormal probability of each load in an online service (in step 3) according to an embodiment of the present disclosure.

In step 3, a coefficient matrix and a detail vector are obtained by performing a discrete wavelet transform to each second sequence, and an abnormal load probability for each coefficient vector of the coefficient matrix is computed by performing a statistical analysis to each coefficient vector of the coefficient matrix. Specific steps are as follows.

In step 3.1, the second sequence not processed is selected from the current online service, a one-dimensional discrete wavelet transform is performed to the second sequence not processed. Haar wavelet is taken as wavelet basis of the one-dimensional discrete wavelet transform, and transform level L is set according to a difference between the fixed time interval $T_I$ and an abnormal detection period $T_s$, in which $T_I \times 2^L \geq T_s$, and the coefficient matrix cA and the detail vector cD are obtained according to following formula:

$$cA, cD = DWT([S_1^x, S_2^x, \ldots, S_n^x], L, \text{'haar'}) \quad (3).$$

In this embodiment, the time interval is 15 minutes, and the abnormal detection period is 12 hours. For the one-dimensional discrete wavelet transform, when the transform level is L (in this embodiment, L=6), the original second sequence is divided into L coefficient vectors (composing the coefficient matrix) and one detail vector. For example, if a discrete wavelet transform with a transform level of L is performed to a second sequence, L coefficient vectors, cA[1], cA[2], ..., cA[L], and one detail vector cD are obtained. For the $i^{th}$ level coefficient vector cA[i], a relationship between a period $P_i$ of cA[i] and a period $P_{i+1}$ of the $(i+1)^{th}$ level coefficient vector cA[i+1] is $P_i \times 2 = P_{i+1}$. At the same time, For the $i^{th}$ level coefficient vector cA[i], a relationship between an element number $N_i$ of cA[i] and an element number $N_{i+1}$ of the $(i+1)^{th}$ level coefficient vector cA[i+1] is $N_i/2 = N_{i+1}$. Thus observation accuracy of the $(i+1)^{th}$ level coefficient vector is only half that of the $i^{th}$ level coefficient vector. Using this feature, discrete wavelet analysis allows sequences to be observed at different time scales.

In step 3.2, coefficient vectors are filtered from the coefficient matrix, a statistical analysis based on a normal distribution is performed to each coefficient vector, and the abnormal load probability of the second sequence not processed is computed. A mean value of the normal distribution is 0, a variance of the normal distribution is an estimated variance of values of the load item in past time of $T_s \times m$, m is an experience value. The abnormal load probability $p_i$ of the second sequence not processed is a largest value of cumulative distribution probabilities of values of the load item at each time point in $T_s$, and computed according to following formula:

$$p_i = 2 * \Phi(|x_i|) - 1, \text{ where } \Phi(x) = \frac{1}{\sqrt{2\pi}} \int_{-\infty}^{x} e^{-t^2/2} dt; \quad (4)$$

In this embodiment, m=3.

In step 3.3, the detail vector is filtered out, and a changing trend of a current load is judged according to the detail vector. If d[−1]<d[−2], the changing trend of the current load is rising, with a value of −1. If d[−1]>d[−2], the changing trend of the current load is declining, with a value of 1. Otherwise the changing trend of the current load is steady, with a value of 0.

In step 3.4, the abnormal load probabilities of all the coefficient vectors are merged, and the abnormal load probability of the current load is obtained according to the abnormal load probabilities of all the coefficient vectors and the changing trend of the current load.

In step 3.5, if there is the second sequence not processed, step 3.1 is executed, otherwise step 4 is executed.

Figure 4:
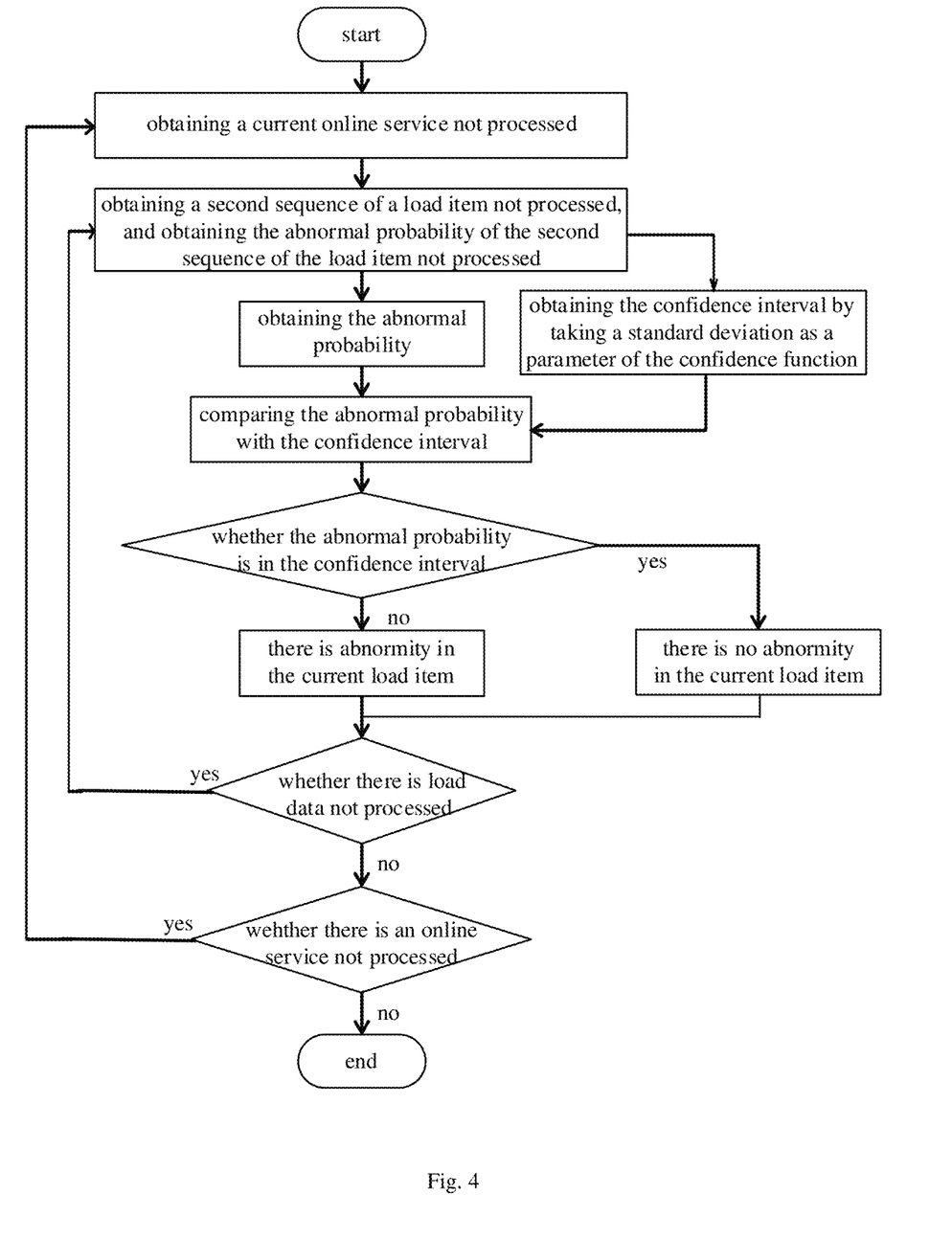
FIG. 4 is a flow chart of judging whether there is an abnormal in each load of the online service (in step 4) according to an embodiment of the present disclosure.

In step 4, a weighted mean of the abnormal load probabilities of all the coefficient vectors of the coefficient matrix is computed with a weighted formula, to obtain an abnormal load probability p of each time sequence, and the abnormal load probability of each time sequence is stored into an online service database. The weighted formula is:

$$p = \frac{\sum w_i p_i}{\sum w_i}, \text{ where } w_i = e^{\log i + 1}; \quad (5)$$

A format for recording abnormal data is shown as table 2.

TABLE 2

Storage formats of the abnormal load probability of the second sequence

| fields | description | type | length | examples |
|--------|-------------|------|--------|----------|
| Service | service identifier | character string | 64 | WebServer1 |
| TimeBegin | begin timestamp | character string | 64 | 2014 Oct. 31 13:10:10 |
| TimeEnd | end timestamp | character string | 64 | 2014 Oct. 31 13:10:10 |
| Deviation | deviation of sequence | float | 4 | 8.9231 |
| Prob | abnormal probability | float | 4 | 0.9231 |
| Trend | changing trend | integer | 4 | 1 |
| CI | confidence interval | float | 4 | 0.9231 |

In step 5, the abnormal load probability of each second sequence is compared with a confidence interval given by a confidence function, and whether there is an abnormal load is judged. If the abnormal load probability of each second sequence is in the confidence interval, there is no abnormity in the corresponding second sequence.

In step 5.1, the second sequence not processed is obtained from all the load items in the current online service, and the abnormal load probability of the second sequence of the load item not processed is obtained.

In step 5.2, a standard deviation t of the second sequence of the load item not processed is computed, and the confidence interval is obtained by taking the standard deviation as a parameter of the confidence function. The confidence function is defined as following:

$$G(t) = c + \frac{2(1-c)}{1 + e^{t/d}}, \quad (6)$$

in which, c is a confidence coefficient, d is a relaxation coefficient, c and d are experience values. In this embodiment, the two coefficients are set as: c=0.6, d=200.

In step 5.3, the abnormal load probability of the second sequence of the load item not processed is obtained, and the abnormal load probability of the second sequence of the load item not processed is compared with the confidence interval (0,G(t)). If the abnormal load probability of the second sequence of the load item not processed is in the confidence interval, there is no abnormity in the current load item, otherwise there is abnormity in the current load item.

In step 5.4, if there is load data not processed, the step 5.1 is executed; otherwise the step 6 is executed.

In step 6, it is judged whether there is an abnormal load in the current online service according to data of all load items of the current online service and the abnormal load probability of each second sequence of the current online service.

Step 6 includes following steps.

In step 6.1, second sequences of all load items that have the abnormity are obtained from the current online service according to a judging result of step 5.

In step 6.2, for each load item that has the abnormity, a time point corresponding to a last point in the second sequence of each load item is recorded as an occurring time point of the abnormal load, and the recorded items are stored into the online service data base.

A format of data items in this embodiment is shown as table 3.

TABLE 3

Storage formats of data items of the abnormal load

| fields | description | type | length | examples |
|---|---|---|---|---|
| Service | service identifier | character string | 64 | WebServer1 |
| TimeBegin | begin timestamp | character string | 64 | 2014 Oct. 31 13:10:10 |
| TimeEnd | end timestamp | character string | 64 | 2014 Oct. 31 13:10:10 |
| Prob | abnormal probability | float | 4 | 0.9231 |
| CI | confidence interval | float | 4 | 0.9231 |

Figure 5:
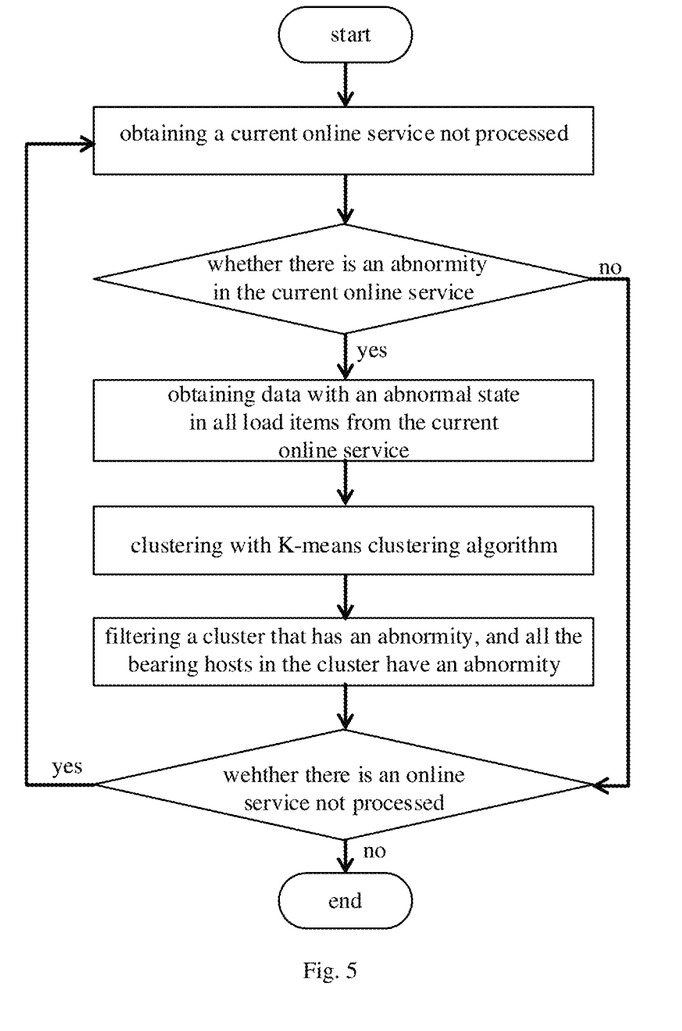
FIG. 5 is a flow chart of finding a bearing host that has an abnormal load (in step 7) according to an embodiment of the present disclosure.

In step 7, a bearing host that has the abnormal load is found from the current online service by using K-means clustering algorithm.

Step 7 includes following steps.

In step 7.1, data with an abnormal state in all load items is obtained from the current online service.

In step 7.2, whether there is an abnormity in the current online service is judged, and if yes, the step is over, otherwise step 7.3 is executed.

In step 7.3, abnormal load data of all bearing hosts that have an abnormity is obtained from the current online service, and the abnormal load data is normalized.

In step 7.4, load data of each bearing host is taken as a vector, and the vectors corresponding to all the bearing hosts are clustered with K-means clustering algorithm and Euclidean distance to obtain clusters.

In step 7.5, standard deviations of two of the clusters are compared, a cluster that has a lager standard deviation is taken as an abnormal cluster, in which there may be an abnormity load in all hosts bearing the online service in the abnormal cluster. The standard deviation is computed as follows.

For each cluster, standard deviations of the second sequences of all load items in the cluster are obtained, and a mean value of the obtained standard deviations is computed, and the mean value is taken as the standard deviation of the cluster.

In step 7.6, if there is an online service not processed, step 1 is executed, otherwise the step is over.

Technical characteristics and beneficial effects of the present disclosure are as follows.

The present disclosure identifies the abnormal load according to a periodic principle and change characteristics of the data of the loads of the online service. The method is based on following principles: an access frequency to the online service of the user is approximately to a normal distribution; a normal change of the access frequency may not cause a large load change in a short time, while the load change caused by abnormal access quantity or program errors may have a large change extent in a short time. Therefore it can be judged whether the load of the current online service is abnormal by analyzing the change rate and the distribution characteristics of the load.

To observe change characteristics of the loads better, the present disclosure performs a multiple time scale analysis on a sequence corresponding to the load with a wavelet analysis. By using a discrete wavelet transform, the sequence is broken up to oscillations on multiple time scales, and the oscillations are analyzed independently on each of the time scales, and then results of each analysis are integrated to obtain a more accurate analysis conclusion.

The present disclosure analyzes the sequence on each of the time scales by statistical analysis. Assuming that load change on each of the time scales is a normal distribution variation, a probability that the current load is an abnormal load is obtained according to a probability density function of the normal distribution variation. A final abnormal probability can be obtained by integrating analysis results on each time scale.

In order to self-adapting of services, the present disclosure provides a variant based on Sigmoid function to compute the confidence interval of abnormal load under different load characteristics. It can be judged whether the current load is abnormal according to the confidence interval and the abnormal probability.

By using the wavelet analysis, the present disclosure has an improving accuracy based on the statistics analysis method, and has a well self-adaptive feature. Thus the present disclosure can not only adapt to different online services, but also work properly under conditions of services program updating and normal oscillation (such as user accesses changing periodically) of service loads.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example", "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for detecting an abnormal load in a cloud computing oriented online service comprising:

step 1, collecting data of each load item in all hosts that bears a current online service with a fixed sampling period;

step 2, pre-processing the data of each load item in all hosts to obtain a first sequence with a fixed time interval, and merging first sequences of all hosts for each load item to obtain a second sequence corresponding to each load item;

step 3, obtaining a coefficient matrix and a detail vector by performing a discrete wavelet transform to each second sequence, and computing an abnormal load probability for each coefficient vector of the coefficient matrix by performing a statistical analysis to each coefficient vector of the coefficient matrix;

step 4, computing a weighted mean of the abnormal load probabilities of all the coefficient vectors of the coefficient matrix with a weighted formula, to obtain an abnormal load probability of each second sequence;

step 5, comparing the abnormal load probability of each second sequence with a confidence interval given by a confidence function, and judging whether there is an abnormal load, and judging that there is no abnormity in the corresponding second sequence if the abnormal load probability of each second sequence is in the confidence interval;

step 6, judging whether there is an abnormal load in the current online service according to data of all load items of the current online service and the abnormal load probability of each second sequence of the current online service, and comprising steps of:

step 6.1, obtaining second sequences of all load items that have the abnormity in the current online service according to a judging result of step 5; and step 6.2, for each load item that has the abnormity, recording a time point corresponding to a last point in the second sequence of each load item as an occurring time point of the abnormal load, and storing the recorded items into the online service data base; and step 7, finding a bearing host that has the abnormal load from the current online service by using K-means clustering algorithm;

wherein step 3 comprises:

step 3.1, performing a one-dimensional discrete wavelet transform to the second sequence to obtain the coefficient matrix cA and the detail vector cD according to following formula:

$$cA,cD=DWT([S_1^x,S_2^x,\ldots,S_n^x],L,\text{'haar'}),$$

where Haar wavelet is taken as wavelet basis of the one-dimensional discrete wavelet transform, and transform level L is set according to a difference between the fixed time interval $T_1$ and an abnormal detection period $T_s$, wherein $S_1^x, S_2^x, \ldots, S_n^x$ represents the second sequence;

step 3.2, filtering coefficient vectors out from the coefficient matrix, performing a statistical analysis based on a normal distribution to each coefficient vector, and computing the abnormal load probability of the second sequence, wherein a mean value of the normal distribution is 0, a variance of the normal distribution is an estimated variance of values of the load item in past time of $T_s \times m$, m is an experience value, the abnormal load probability of the second sequence is a largest value of cumulative distribution probabilities of values of the load item at each time point in $T_s$, and computed according to following formula of:

$$p_i = 2*\Phi(|x_i|) - 1, \text{ where } \Phi(x) = \frac{1}{\sqrt{2\pi}} \int_{-\infty}^{x} e^{-t^2/2} dt$$

step 3.3, filtering out the detail vector, and judging a changing trend of a current load according to the detail vector, wherein, if $d[-1]<d[-2]$, the changing trend of the current load is rising, with a value of −1, if $d[-1]>d[-2]$, the changing trend of the current load is declining, with a value of 1, otherwise the changing trend of the current load is steady, with a value of 0;

step 3.4, obtaining the abnormal load probability of the current load according to the abnormal load probabilities of all the coefficient vectors and the changing trend of the current load; and step 3.5, if there is the second sequence that is not processed, executing step 3.1, otherwise executing step 4.

2. The method according to claim 1, wherein step 2 further comprises:

step 2.1, if data at a time point of a load item in a host is null, interpolating a value of the data at the time point of the load item in the host according to a mean algorithm.

3. The method according to claim 1, wherein step 5 comprises:
   step 5.1, obtaining the second sequence in the current online service, and obtaining the abnormal load probability of the second sequence;
   step 5.2, computing a standard deviation of the second sequence, and obtaining the confidence interval by taking the standard deviation as a parameter of the confidence function, wherein the confidence function is defined as following:

$$G(t) = c + \frac{2(1-c)}{1 + e^{t/d}}, \quad (6)$$

where, c is a confidence coefficient, d is a relaxation coefficient, c and d are experience values;
   step 5.3, obtaining the abnormal load probability of the second sequence not processed, and comparing the abnormal load probability of the second sequence not processed with the confidence interval (0,G(t)), if the abnormal load probability of the second sequence not processed is in the confidence interval, indicating that there is no abnormity in the current load item, otherwise indicating that there is abnormity in the current load item; and
   step 5.4, if there is the second sequence that is not processed, executing step 5.1, otherwise executing step 6.

4. The method according to claim 1, wherein step 7 comprises:
   step 7.1, obtaining data with an abnormal state in all load items from the current online service;
   step 7.2, judging whether there is an abnormity in the current online service, if yes, ending the step, otherwise executing step 7.3;
   step 7.3, obtaining abnormal load data of all bearing hosts that have an abnormity from the current online service, and normalizing the abnormal load data;
   step 7.4, taking the normalized abnormal load data of each bearing host as a vector, and clustering the vectors corresponding to all the bearing hosts with K-means clustering algorithm and Euclidean distance;
   step 7.5, comparing standard deviations of two of the clusters, taking a cluster that has a larger standard deviation as an abnormal cluster, wherein there is an abnormity load in all hosts bearing the online service in the abnormal cluster, and the standard deviation is computed as follows:
   for each cluster, obtaining standard deviations of the second sequences of all load items in the cluster, computing a mean value of the obtained standard deviations, and taking the mean value as the standard deviation of the cluster;
   step 7.6, if there is an online service not processed, executing step 1, otherwise ending the step.

5. The method according to claim 1, wherein the data of each load item is denoted as $(d_1^x, d_2^x, \ldots, d_i^x, \ldots, d_n^x)$, where i=1, 2, ..., n, n is a positive integer, x represents the load item, the load item comprises a Central Processing Unit CPU usage rate, a memory usage rate, a disk I/O usage rate or a network I/O usage rate, $d_i^x$ is a value of the load item x at an $i^{th}$ time point.

6. The method according to claim 5, wherein pre-processing the data of each load item in all hosts to obtain a first sequence with a fixed time interval comprises:
obtaining an element of the first sequence by a formula of $$s_i^x = \text{average}(d_{(i-1) \times k+1}^x, d_{(i-1) \times k+2}^x, \ldots, d_{(i-1) \times k+k}^x)$$

where the first sequence corresponding to each load item is denoted as $(s_1^x, s_2^x, \ldots, s_i^x, \ldots, s_n^x)$, $s_i^x$ represents the element of the first sequence, k is a ratio of the fixed time interval to the fixed sampling period.

7. The method according to claim 6, wherein merging first sequences of all hosts for each load item to obtain a second sequence corresponding to each load item comprises:
obtaining an element of the second sequence by a formula of $$S_i^x = \sum_{j=1}^{q} s_{i,j}^x / q$$

where the second sequence corresponding to each load item is denoted as $(S_1^x, S_2^x, \ldots, S_i^x, \ldots, S_n^x)$, $S_i^x$ represents the element of the second sequence, $s_{i,j}^x$ is the element of the second sequence corresponding to the load item x at an $i^{th}$ time point in a $j^{th}$ host, q is the number of the hosts.

8. The method according to claim 5, wherein the weighted formula is:

$$p = \frac{\sum w_i p_i}{\sum w_i}, \text{ where } p_i = 2 * \Phi(|x_i|) - 1, \Phi(x) = \frac{1}{\sqrt{2\pi}} \int_{-\infty}^{x} e^{-t^2/2} dt$$

$w_i = e^{\log i + 1}$, $p_i$ is the abnormal load probability of an $i^{th}$ coefficient vector, and $w_i$ is a weight of the abnormal load probability of the $i^{th}$ coefficient vector.

9. A device for detecting an abnormal load in a cloud computing oriented online service comprising:
   a processor; and a memory for storing instructions executable by the processor,
   wherein the processor is configured to:
   collect data of each load item in all hosts that bears a current online service with a fixed sampling period;
   pre-process the data of each load item in all hosts to obtain a first sequence with a fixed time interval, and merge first sequences of all hosts for each load item to obtain a second sequence corresponding to each load item;
   obtain a coefficient matrix and a detail vector by performing a discrete wavelet transform to each second sequence, and compute an abnormal load probability for each coefficient vector of the coefficient matrix by performing a statistical analysis to each coefficient vector of the coefficient matrix;
   compute a weighted mean of the abnormal load probabilities of all the coefficient vectors of the coefficient matrix with a weighted formula, to obtain an abnormal load probability of each second sequence;
   compare the abnormal load probability of each second sequence with a confidence interval given by a confidence function, and judge whether there is an abnormal load, and judge that there is no abnormity in the corresponding second sequence if the abnormal load probability of each second sequence is in the confidence interval;
   obtain second sequences of all load items that have the abnormity in the current online service according to a judging result of whether there is an abnormal load, and judging that there is no abnormity in the corresponding second sequence if the abnormal load probability of each second sequence is in the confidence interval; and for each load item that has the abnormity, record a time point corresponding to a last point in the second sequence of each load item as an occurring time point of the abnormal load, and store the recorded items into the online service data base; and find a bearing host that has the abnormal load from the current online service by using K-means clustering algorithm;

perform a one-dimensional discrete wavelet transform to the second sequence to obtain the coefficient matrix cA and the detail vector cD according to following formula:

$$cA, cD = DWT([S_1^x, S_2^x, \ldots, S_n^x], L, \text{'haar'}),$$

where Haar wavelet is taken as wavelet basis of the one-dimensional discrete wavelet transform, and transform level L is set according to a difference between the fixed time interval $T_1$ and an abnormal detection period $T_s$, wherein $S_1^x, S_2^x, \ldots, S_n^x$ represents the second sequence;

filter coefficient vectors out from the coefficient matrix, perform a statistical analysis based on a normal distribution to each coefficient vector, and compute the abnormal load probability of the second sequence, wherein a mean value of the normal distribution is 0, a variance of the normal distribution is an estimated variance of values of the load item in past time of $T_s \times m$, m is an experience value, the abnormal load probability of the second sequence is a largest value of cumulative distribution probabilities of values of the load item at each time point in $T_s$, and computed according to following formula of:

$$p_i = 2 * \Phi(|x_i|) - 1, \text{ where } \Phi(x) = \frac{1}{\sqrt{2\pi}} \int_{-\infty}^{x} e^{-t^2/2} dt$$

filter out the detail vector, and judge a changing trend of a current load according to the detail vector, wherein, if $d[-1] < d[-2]$, the changing trend of the current load is rising, with a value of −1, if $d[-1] > d[-2]$, the changing trend of the current load is declining, with a value of 1, otherwise the changing trend of the current load is steady, with a value of 0;

obtain the abnormal load probability of the current load according to the abnormal load probabilities of all the coefficient vectors and the changing trend of the current load; and if there is the second sequence that is not processed, perform the one-dimensional discrete wavelet transform to the second sequence to obtain the coefficient matrix cA and the detail vector cD according to the following formula:

$$cA, cD = DWT([S_1^x, S_2^x, \ldots, S_n^x], L, \text{'haar'}),$$

where Haar wavelet is taken as wavelet basis of the one-dimensional discrete wavelet transform, and transform level L is set according to the difference between the fixed time interval $T_1$ and the abnormal detection period $T_s$, wherein $S_1^x, S_2^x, \ldots, S_n^x$ represents the second sequence, otherwise compute the weighted mean of the abnormal load probabilities of all the coefficient vectors of the coefficient matrix with the weighted formula, to obtain the abnormal load probability of each second sequence.

10. A non-transitory computer-readable storage medium having stored therein instructions that, when executed by a processor of an intelligent terminal, causes the intelligent terminal to perform a method for loading a theme application, the method comprising:

step 1, collecting data of each load item in all hosts that bears a current online service with a fixed sampling period;

step 2, pre-processing the data of each load item in all hosts to obtain a first sequence with a fixed time interval, and merging first sequences of all hosts for each load item to obtain a second sequence corresponding to each load item;

step 3, obtaining a coefficient matrix and a detail vector by performing a discrete wavelet transform to each second sequence, and computing an abnormal load probability for each coefficient vector of the coefficient matrix by performing a statistical analysis to each coefficient vector of the coefficient matrix;

step 4, computing a weighted mean of the abnormal load probabilities of all the coefficient vectors of the coefficient matrix with a weighted formula, to obtain an abnormal load probability of each second sequence;

step 5, comparing the abnormal load probability of each second sequence with a confidence interval given by a confidence function, and judging whether there is an abnormal load, and judging that there is no abnormity in the corresponding second sequence if the abnormal load probability of each second sequence is in the confidence interval;

step 6.1, obtaining second sequences of all load items that have the abnormity in the current online service according to a judging result of step 5; and step 6.2, for each load item that has the abnormity, recording a time point corresponding to a last point in the second sequence of each load item as an occurring time point of the abnormal load, and storing the recorded items into the online service data base; and step 7, finding a bearing host that has the abnormal load from the current online service by using K-means clustering algorithm;

wherein step 3 comprises:

step 3.1, performing a one-dimensional discrete wavelet transform to the second sequence to obtain the coefficient matrix cA and the detail vector cD according to following formula:

$$cA, cD = DWT([S_1^x, S_2^x, \ldots, S_n^x], L, \text{'haar'}),$$

where Haar wavelet is taken as wavelet basis of the one-dimensional discrete wavelet transform, and transform level L is set according to a difference between the fixed time interval $T_1$ and an abnormal detection period $T_s$, wherein $S_1^x, S_2^x, \ldots, S_n^x$ represents the second sequence;

step 3.2, filtering coefficient vectors out from the coefficient matrix, performing a statistical analysis based on a normal distribution to each coefficient vector, and computing the abnormal load probability of the second sequence, wherein a mean value of the normal distribution is 0, a variance of the normal distribution is an estimated variance of values of the load item in past time of $T_s \times m$, m is an experience value, the abnormal load probability of the second sequence is a largest value of cumulative distribution probabilities of values of the load item at each time point in $T_s$, and computed according to following formula of:

$$p_i = 2 * \Phi(|x_i|) - 1, \text{ where } \Phi(x) = \frac{1}{\sqrt{2\pi}} \int_{-\infty}^{x} e^{-t^2/2} dt \qquad 5$$

step 3.3, filtering out the detail vector, and judging a changing trend of a current load according to the detail vector, wherein, if $d[-1] < d[-2]$, the changing trend of the current load is rising, with a value of −1, if $d[-1] > d[-2]$, the changing trend of the current load is declining, with a value of 1, otherwise the changing trend of the current load is steady, with a value of 0;

step 3.4, obtaining the abnormal load probability of the current load according to the abnormal load probabilities of all the coefficient vectors and the changing trend of the current load; and step 3.5, if there is the second sequence that is not processed, executing step 3.1, otherwise executing step 4.

* * * * *